R. A. KIEFER.
STERILIZER.
APPLICATION FILED OCT. 14, 1911.

1,059,544.

Patented Apr. 22, 1913.

2 SHEETS—SHEET 1.

Witnesses:
O. Leo Kiselbach
William P. Brady

Inventor
Raymond A. Kiefer
By his Attorney
Wm Bodge

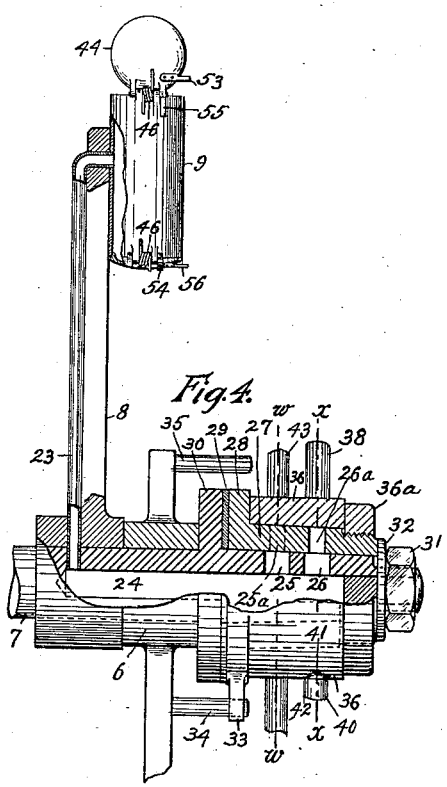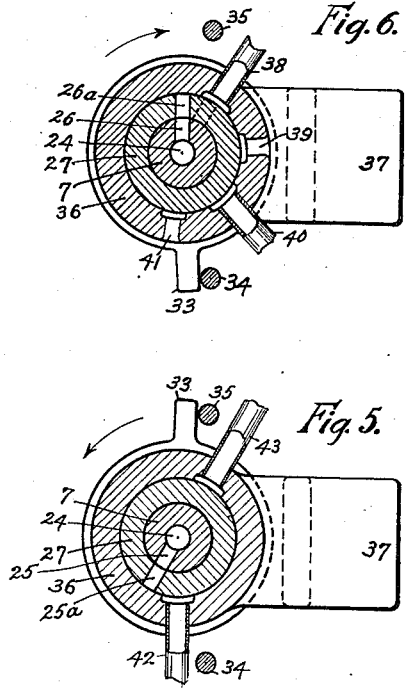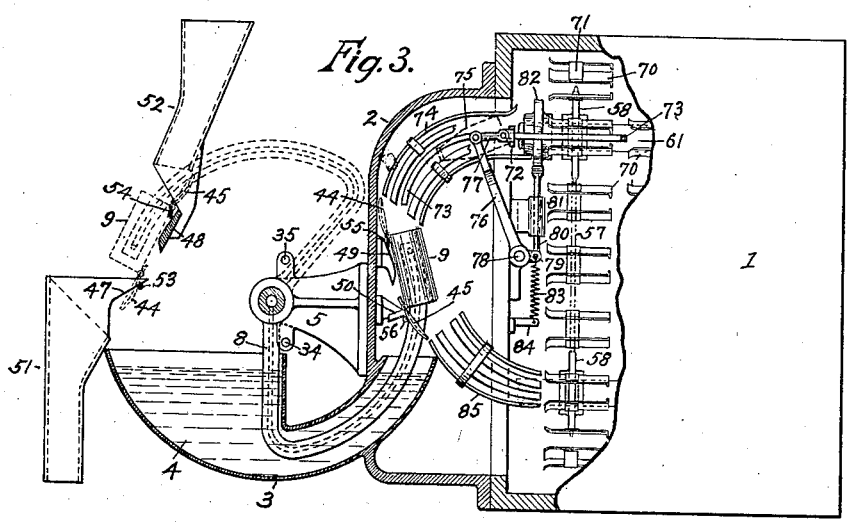

UNITED STATES PATENT OFFICE.

RAYMOND A. KIEFER, OF RAMSEY, NEW JERSEY, ASSIGNOR OF ONE-HALF TO WILLIAM J. CARSHORE, JR., OF RAMSEY, NEW JERSEY.

STERILIZER.

1,059,544.  Specification of Letters Patent.  Patented Apr. 22, 1913.

Application filed October 14, 1911. Serial No. 654,743.

*To all whom it may concern:*

Be it known that I, RAYMOND A. KIEFER, a citizen of the United States, and resident of Ramsey, in the county of Bergen and State of New Jersey, have invented certain new and useful Improvements in Sterilizers, of which the following is a specification.

The invention relates to improvements in sterilizers, in which portable articles, as bottles or other containers, are subjected to the action of a gaseous germicide confined within a chamber; and the objects of the invention are to provide means for introducing and discharging the work to and from the gas-chamber, to handle the same within the chamber in such manner as to effectively secure complete sterilization of the articles, and to facilitate the introduction and discharge thereof, to so control the gas within the apparatus as to prevent its objectionable escape or loss, and to remove from the work before its discharge all offensive odor or other objectionable characteristics originating from the sterilizing agent.

Figure 1:
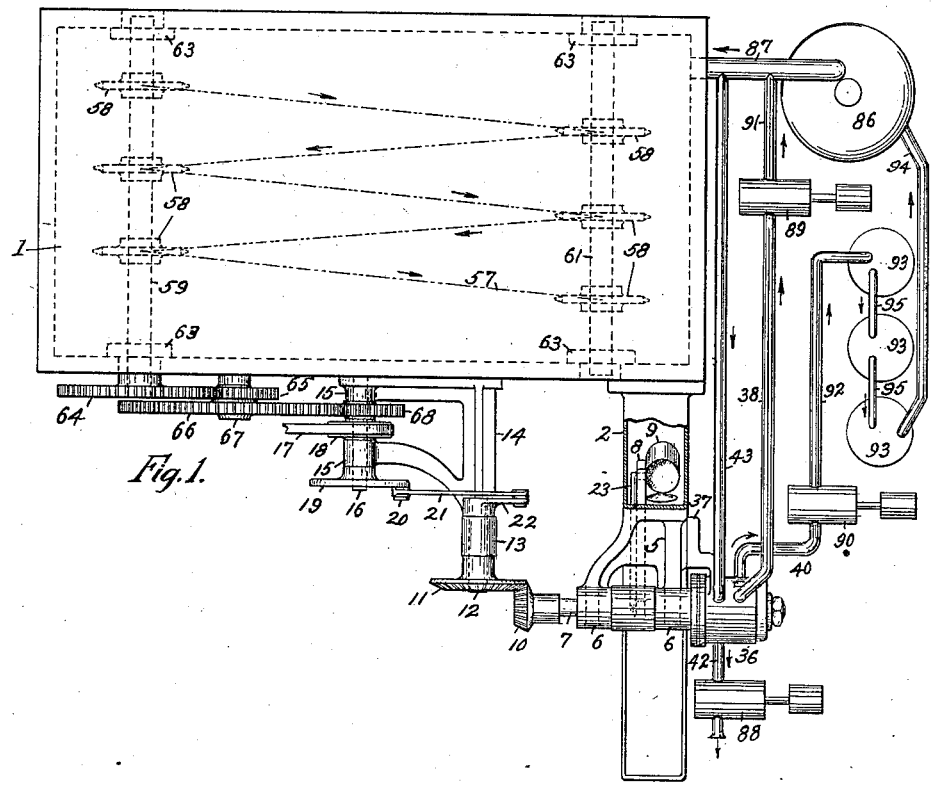
Figure 2:
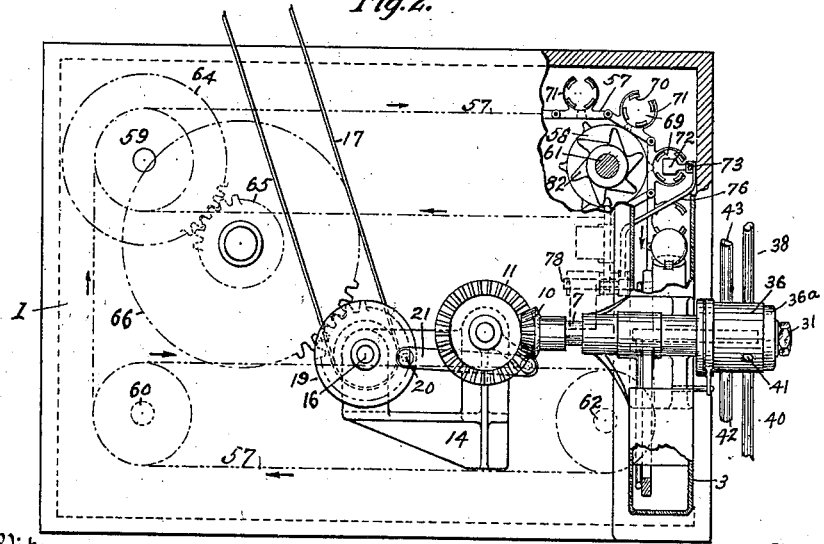

In describing the invention in detail, reference is had to the accompanying drawings, forming part of this specification and wherein like characters of reference are used to designate like parts throughout the several views, and in which:

Figure 1 is a ground plan of the sterilizer embodied in the present invention, having a portion of the seal-casing removed; Fig. 2, a side elevation, shown also with a portion of a wall removed; Fig. 3, an end elevation, partially in section; Fig. 4, an enlarged detail view, partially in section, of a case for transporting the work to and from the gas-chamber, shown in connection with a valve device for controlling the admission and discharge of gas; Fig. 5, a transverse section on line $w-w$, Fig. 4; and Fig. 6, a transverse section on line $x-x$, Fig. 4.

In the drawings, numeral 1 designates a closed gas-chamber, provided on one side thereof with a seal-casing 2, the latter being formed at its lower part with a seal or trap member 3, arranged for containing the sealing fluid 4, forming a connection between the atmosphere and the gas-chamber. Upon the seal-casing is fixed a bracket 5, carrying the bearings 6, in which is mounted for oscillation the shaft 7, fixedly provided between said bearings with the bent arm 8, on the free end of which is fixed a shuttle case 9, adapted to receive and transport the work to be treated to and from the gas-chamber through the fluid seal.

For imparting oscillatory movement to the shuttle case, a gear 10 is fixed upon one end of shaft 7, and is engaged by a larger gear 11, fixed upon the short rock-shaft 12, the latter mounted in the bearing 13, formed on the end of hanger 14, attached to the gas-chamber. Bearings 15 are also provided on the hanger for rotatably receiving the shaft 16, arranged to be driven from a convenient source of power by the belt 17 and the pulley 18. Upon the end of shaft 16 is fixed a crank-disk 19, having a pin 20, engaging one end of a connecting-rod 21, the opposite end of the latter being likewise connected by a pin to the rock-arm 22, fixed upon one end of rock-shaft 12. By suitably proportioning the above actuating parts, the necessary forward and backward movement of the shuttle case will be effected at each revolution of the driving-shaft 16.

Communication to the interior of the shuttle case is effected by a tube 23, which extends along the arm 8, and leads to a central passage 24, formed in one end of the shaft 7, and provided with two orifices 25 and 26 extending through the wall thereof and arranged to be opened and closed alternately by a valve-ring 27, mounted thereon, and provided with registering ports 25$^a$ and 26$^a$. An annular flange 28 is formed on the valve-ring which is arranged for adjustable slipping engagement through the friction-ring 29 with a corresponding flange or collar 30, formed on the shaft 7, which engagement is effected by the nut 31 and washer 32, engaging the end of the shaft and providing sufficient clamping action to cause the ring and shaft to normally oscillate together. For the actuation of the valve-ring, a projecting lug 33 is formed thereon which is adapted at the terminals of its joint movement with the shaft to be arrested by its engagement with the fixed stops 34 and 35, secured to projections on the adjacent bearing 6.

Surrounding the oscillatory valve-ring 27 is a fixed valve shell or casing 36, slidingly retained upon the latter by the nut 36ª, engaging a screw-threaded end on the ring, and by an integral foot 37, secured to the bracket 5. A series of ducts or pipe connections extend through the wall of the casing and are arranged to be successively engaged by the corresponding ports in the valve-ring to effect a periodical communication with the shuttle case. As indicated in Figs. 3, 4, 5 and 6, the several parts are positioned with respect to the extreme forward movement of the shuttle case, Fig. 5, designating the number and arrangement of ducts and ports required during the forward movement thereof, and Fig. 6, those necessary during the backward or return movement, the arrows shown therein designating to continue the remainder of its movement, During the backward movement, the orifice 26 and port 26ª are in line with each other and will successively engage and cut off the ducts 38, 39, 40 and 41 formed in the fixed casing, and by the continued movement, the lug 33 will engage stop 35, arresting the valve-ring 27, while permitting the shaft 7 to continue the remainder of its movement, the same being sufficient to close communication between orifice 26 and port 26ª and open the laterally disposed orifice 25 and port 25ª, the latter condition being shown in full lines in Fig. 5, which represents the position of the parts at the beginning of the forward movement of the shuttle case, during which movement the ports 42 and 43 are similarly engaged and cut off, and the orifices and ports readjusted for a second backward movement by the engagement of the lug 33 with the stop 34.

The shuttle case 9 is provided at its opposite ends with hinged doors 44 and 45, normally closed by the springs 46, and automatically opened at the terminals of the movement of the case by the fixed cam-sections 47, 48, 49 and 50, suitably positioned for engagement by projecting lugs on the covers. In the outer or atmospheric position of the case, as indicated in dotted lines in Fig. 3, the doors are opened for the discharge of the treated work through the chute 51, and for the introduction of the untreated work through the chute 52. For the discharge of the work, door 44 is opened by the engagement of its lug 53 with the cam-section 47, formed on the discharge-chute 51; and for the introduction of the work, door 45 is opened by the engagement of its lug 54 with the cam-section 48. By suitably arranging the cams the doors will be opened and closed by the movement of the case in opposite directions, the forward movement permitting the closing of the doors by the action of the springs thereon prior to the passage through the seal. In a similar manner the doors of the case are opened and closed within the gas-chamber for the discharge and introduction of the work; the door 44, by the engagement of its lug 55 with the cam 49, attached to the seal-casing 2; and door 45, by the engagement of its lug 56 with the cam 50, likewise attached to the seal-casing.

For handling the work within the gas-chamber, a carrier is provided consisting of an endless band or chain 57, mounted upon a series of wheels 58, fixed upon shafts 59, 60, 61 and 62, rotatably mounted within the chamber in the bearings 63. One end of shaft 59 extends through the wall of the chamber and is provided with a driving-gear 64, which receives its motion through a pair of intermediate gears 65 and 66, fixed together and loosely mounted upon stud 67, secured to the wall of the chamber, the intermediate gears being rotated by gear 68, fixed upon shaft 16. By suitably proportioning the gears the endless carrier-chain 57 and the holders or cages 69 thereon will be continuously driven in one direction at a rate of speed corresponding to the advance of one holder for each cycle or joint forward and backward movement of the shuttle case. As shown in Figs. 1, 2 and 3, the work holders or cages 69 are connected to each link of the endless chain, and adjacent the shuttle case and between shafts 61 and 62 the chain runs downwardly over the wheels in a vertical line, from which lower wheel it passes forward and backward between shafts 62 and 60 in a spiral manner toward the rear of the gas-chamber, thence upwardly in a vertical line to a wheel on shaft 59, from which it travels to shaft 61, forward and backward spirally to the front of the chamber adjacent the shuttle case. It will be obvious that the length of the chain and the size of the gas-chamber required will be governed by the time necessary for effecting the complete sterilization of the work, the same being facilitated by the latter in its movement which tends to agitate the gas for its more complete and rapid association and action.

The work holders or cages 69 may be of any approved form of construction to receive and hold the work, and as herein shown, consist of a series of strips 70 transversely supported upon the links of the chain by the bands 71 in such manner as to provide a clear space between two adjacent strips for the passage of a dog or driver 72, slidingly mounted upon a fixed curved guide-bar 73, conveniently supported upon the wall of the gas-chamber. Following the line of the guide-bar and leading from the work-cages to the shuttle case is a chute 74, also preferably constructed of suitably-supported longitudinal strips arranged to guide the treated work, the latter being indicated by the dotted lines 75. For the passage of the work through the chute the driver 72 engages the rearward end thereof, and is itself actuated by the rocker-arm 76 and the connection-link 77, the rocker-arm being pivotally mounted at its lower end upon a stud 78 fixed to the wall of the gas-chamber. Upon the rocker-arm at its lower end is formed a short lever-arm 79, to the free end of which a rod 80 is pivotally connected at its lower end and extends upwardly, the upper end being slidingly supported for vertical movement by the guide-bracket 81, and arranged for engagement by a series of cams 82, formed upon a hub fixed to shaft 61. The action of the cams upon the rod 80 serves to inwardly swing the rocker-arm 76 in opposition to the compression-spring 83, the terminals of the latter respectively engaging the fixed abutment 84 and the end of lever-arm 79. The number of cams formed upon the hub corresponds with the number of teeth in the adjacent chain-wheel 58, and they are so shaped and timed as to cause during the inward swing of the arm the free idle travel of the driver 72 between the consecutive work-cages 69, and during the outward swing to permit the action of the spring to effect a sufficiently rapid movement for the passage of the driver through the cages without interfering with the continuously advancing movement of the latter. Within the gas-chamber is also mounted a chute 85, leading from the shuttle case to the work-cages, and likewise preferably composed of longitudinal strips, shaped with sufficient drop or pitch to ordinarily permit the work to feed by gravity into the cages. In such instances where the nature of the work or the position of the shuttle case with respect to the work-cages does not admit of a gravity feed, a driver acting upon the work may be provided for chute 85, constructed and operated similarly to that described for chute 74.

For the source of gas supply and the control thereof within the apparatus, a generator 86, of any approved construction, is employed and provided with a gas-delivery pipe 87 leading to the gas-chamber 1. From the delivery-pipe 87 a branch pipe or duct 43 is led to the valve-case 36, and from the latter the duct 42 leads to a vacuum pump 88. The valve-case is also connected by ducts 38 and 40 to vacuum-pumps 89 and 90, respectively, the former having a discharge-duct 91 leading to pipe 87, and the latter pump having a discharge 92 leading to a series of absorption-chambers 93.

In the operation of the sterilizer, the work is fed either by hand, or by a suitably-timed mechanical feeder, not shown, to the chute 52, through which it is delivered to the shuttle case shortly after the latter has started its forward movement and effected the closing of the lower door 44. As the movement of the case continues, the upper door 45 is likewise closed automatically by spring action in the manner heretofore described, and the case with its inclosed work passes through the fluid seal, during which forward movement atmospheric air is exhausted from the case through the duct 42 by the pump 88, from which it is discharged into the surrounding air. A vacuum-chamber may be provided in the duct-line 42 to equalize the tension of the air suction. Also during the forward movement of the case and subsequent to the discharge of the air therefrom, sterilizing gas is admitted through the duct 43, which admission equalizes the pressure on the inner and outer sides of the case as the latter enters the gas-chamber, and permits a free opening movement of the doors 44 and 45 for transferring the untreated work forward from the case to the carrier and the treated work backward from the carrier to the case again, the latter transfer being timed for the admission of the work to the case as the latter starts on its return movement and has effected the closing movement or door 45 to retain the work. As the return movement continues the door 44 is closed and the work inclosed within the case passes through the seal again to the atmosphere. During this return, the gas confined within the case is exhausted through the duct 38 by means of the vacuum-pump 89, which returns it through duct 91 and pipe 87 to the gas-chamber. After the exhaustion of the gas from the case, air is admitted thereto through the duct 39 and serves to mingle with and neutralize any residual gas and absorb all remaining odors, the mixed air during the continued movement of the case, being exhausted through the duct 40 by the vacuum-pump 90, which delivers it through the duct 92 to the absorption-chambers 93. The chambers are of ordinary construction, arranged to be partially filled with water or other liquid having an affinity for and serving to unite with and absorb the sterilizing gas contained in the mixed air, which is forced through duct 92 to the bottom of the first chamber and upward through the contained liquid, from which point it is similarly carried by the ducts 95 through the liquid of the remaining chambers and delivered in a separated state through the pipe 94 to the generator.

While the use of air has been described for absorbing the residual gas within the shuttle case, it will be evident that other neutralizing agents may be similarly employed and the disposition thereof varied to suit the nature of the sterilizing agent, which in some situations may preferably consist of gaseous formaldehyde. Also the material comprising the fluid or liquid seal may be varied to suit the nature of the gas in contact therewith and the pressure under which the same is used, the latter under ordinary conditions of work being approximately equal to the weight of the atmosphere.

It is to be understood that while I have illustrated and described the preferred embodiment of the invention, it is susceptible of various changes as regards its form, detail construction and arrangement of parts without departing from the general principle or scope of the invention.

What I claim as my invention and desire to secure by Letters Patent, is:

1. A sterilizer comprising a closed gas-chamber, a source of sterilizing-gas therefor, a liquid seal-connection leading between the gas-chamber and the atmosphere, a shuttle case arranged to inclose the work and traversing said seal-connection, and means for introducing and discharging the work to and from said case at the terminals of the seal-connection, substantially as set forth.

2. A sterilizer comprising a closed gas-chamber, a work-carrier therein, a liquid seal-connection leading between the gas-chamber and the atmosphere, a shuttle case traversing said seal-connection, means for admitting and discharging work to and from said case at the atmospheric terminal of the seal-connection, and means for transferring the work forward from the case to the carrier and backward from the carrier to the case at the gas-chamber terminal of said seal-connection, substantially as set forth.

3. A sterilizer comprising a closed gas-chamber, a source of sterilizing-gas therefor, a liquid seal-connection leading between the gas-chamber and the atmosphere, a shuttle case adapted for the reception, inclosure and delivery of the work between the atmosphere and the gas-chamber, means for effecting a forward and backward movement of the case through said seal-connection, means for exhausting atmospheric air from said case and admitting gas thereto during the forward movement thereof, and means for exhausting gas from the case and admitting air thereto during the backward movement thereof, substantially as set forth.

4. A sterilizer comprising a closed gas-chamber, a source of sterilizing-gas therefor, a liquid seal-connection leading between the gas-chamber and the atmosphere, a shuttle case adapted for the reception, inclosure and delivery of the work between the atmosphere and the gas-chamber, means for effecting a forward and backward movement of the case through said seal-connection, means for exhausting atmospheric air from said case and admitting gas thereto during the forward movement thereof, and means for transferring the gas from said case to the gas-chamber and admitting air to the case during the return movement thereof, substantially as set forth.

5. A sterilizer comprising a closed gas-chamber, a source of sterilizing-gas therefor, a liquid seal-connection leading between the gas-chamber and the atmosphere, a shuttle case adapted for the reception, inclosure and delivery of the work between the atmosphere and the gas-chamber, means for effecting a forward and backward movement of the case through said seal-connection, means for exhausting atmospheric air from said case and admitting gas thereto during the forward movement thereof, and means in connection with the case operating during the backward movement thereof to successively exhaust the gas therefrom, admit air or neutralizing agent thereto, exhaust the latter therefrom, and admit air thereto, substantially as set forth.

6. In a sterilizer, the combination with a closed gas-chamber, of an endless work-carrier mounted for continuous movement within said chamber, a liquid seal-connection leading between the gas-chamber and the atmosphere, a shuttle case arranged to inclose the work and traversing said seal-connection, and means for transferring the work forward from the shuttle case to the endless work-carrier and backward from the carrier to the shuttle case.

7. In a sterilizer, the combination with a closed gas-chamber, of a liquid seal-connection leading between the gas-chamber and the atmosphere, a shaft supported adjacent said seal-connection, a shuttle case carried by said shaft and adapted to traverse said seal, and means for rocking said shaft.

8. In a sterilizer, the combination with a closed gas-chamber, of a liquid seal-connection leading between the gas-chamber and the atmosphere, a shaft supported adjacent said seal-connection, a shuttle case carried by said shaft and adapted to pass through said seal-connection, and a valve-controlled passage leading to said shuttle case.

9. In a sterilizer, the combination with a closed gas-chamber, of a liquid seal-connection leading between the gas-chamber and the atmosphere, a shaft supported adjacent said seal and having an axial passage provided with a port extending through the wall thereof, a shuttle case carried by said shaft adapted to pass through said seal and having a tubular connection communicating between the interior thereof and the passage in said shaft, a fixed valve-case surrounding said shaft and having ducts extending through the wall thereof, a valve-ring interposed between said case and shaft and normally movable with the latter, an orifice extending through the wall of said ring arranged for engagement with said port and ducts, means for rocking said shaft, and means for arresting the movement of said valve-ring during the motion of the shaft.

10. In a sterilizer, the combination with a closed gas-chamber, of a liquid seal-connection leading between the gas-chamber and the atmosphere, a shaft supported adjacent said seal-connection, a shuttle case carried by said shaft and adapted to pass through said seal-connection, doors provided for the opposite ends of said shuttle case, means for rocking said shaft for the movement of said shuttle case, and means actuated by the movement of said shuttle case for opening and closing the doors thereof.

Signed at New York in the county of New York and State of New York this 13th day of October A. D. 1911.

RAYMOND A. KIEFER.

Witnesses:
 Rose Fenerlecht,
 O. Leon Kieselbach.

---

Copies of this patent may be obtained for five cents each, by addressing the "Commissioner of Patents, Washington, D. C."